United States Patent [19]

Takahashi et al.

[11] Patent Number: 4,921,330
[45] Date of Patent: May 1, 1990

[54] BACK PROJECTION SCREEN IN A VIDEO PROJECTOR

[75] Inventors: Motoo Takahashi; Kazuo Tsukagoshi, both of Nagaokakyo, Japan

[73] Assignee: Mitsubishi Denki Kabushiki Kaisha, Tokyo, Japan

[21] Appl. No.: 259,255

[22] Filed: Oct. 18, 1988

[30] Foreign Application Priority Data

Oct. 19, 1987 [JP] Japan .................. 62-264156

[51] Int. Cl.$^5$ .................. G03B 21/60
[52] U.S. Cl. .................. 350/128
[58] Field of Search ........... 350/117, 124, 127–129; 352/104; 353/71, 72, 74–78; 358/254, 255

[56] References Cited

U.S. PATENT DOCUMENTS

| 3,580,661 | 5/1971 | Cooper, Jr. ............ 350/128 X |
| 4,439,027 | 3/1984 | Shioda et al. .......... 350/128 X |
| 4,512,631 | 4/1985 | Van Breemen .......... 350/128 |
| 4,679,900 | 7/1987 | McKechnie et al. ...... 350/128 X |
| 4,730,897 | 3/1988 | McKechnie et al. ...... 350/128 |

FOREIGN PATENT DOCUMENTS 60-61738  4/1985  Japan .

Primary Examiner—Richard A. Wintercorn
Attorney, Agent, or Firm—Birch, Stewart, Kolasch & Birch

[57] ABSTRACT

A video projector includes a cabinet having a scren mounting opening, a projector unit housed within the cabinet, and a generally rectangular composite projection screen secured to the cabinet to cover the screen mounting opening and a picture is projected from the projector unit onto the screen. The composite screen includes a laminar structure of a Fresnel lens plate and a lenticular lens plate. The lenticular lens plate has a height smaller than the height of the Fresnel lens plate and an upper edge connected by adhesive tape with an upper edge of the Fresnel lens plate such than a lower edge of the lenticular lens plate opposite to the upper edge is offset in an upward direction relative to a lower edge of the Fresnel lens plate to provide a margin extending along the width of the composite screen for accommodating the expansion of the lenticular lens plate. The composite screen is secured to the cabinet and covers the screen mounting opening so that a gap can be formed between the upper clamping fixture and the top edge of the composite screen.

4 Claims, 3 Drawing Sheets

BACK PROJECTION SCREEN IN A VIDEO PROJECTOR

BACKGROUND OF THE INVENTION

1. Field of the Invention

The present invention generally relates to a video projector such as a projection type television apparatus and, more particularly, to a back projection screen used therein for the reproduction of projected images thereon.

2. Description of the Prior Art

The projection type television apparatus employing a projection screen which are currently available in the market can be generally classified in two types depending on the direction in which image is projected onto the screen. The two types are a front projection type and a back projection type. As a matter of course, the front projection screen is reflective and operates to reflect the imagewise rays of light that are projected from one or three cathode ray tubes, towards viewers in front of the television apparatus. The back projection screen is light-transmissive and operates to pass the imagewise rays of light therethrough towards viewers in front of the television apparatus.

Of these two types of projection screens, the present invention pertains to the back projection type.

A composite projection screen that is used in the back projection type is well known to generally include a plastic sheet or plate having a Fresnel lens embossed or formed in any suitable manner on one surface thereof, and a light-diffusing sheet or plate held or integrated in a face-to-face relationship with the plastic sheet. An example of the back projection type television apparatus utilizing the composite projection screen is illustrated in a schematic side sectional representation of FIG. 3. Reference to FIG. 3 will be made for the discussion of the manner in which the composite back projection screen is supported according to the prior art.

The television apparatus comprises a generally rectangular upright cabinet 1 including a front wall 1b having a rectangular front opening 1a defined therein, a correspondingly rectangular composite screen Sa secured to the front wall 1b which closes the front opening 1a, and a rear wall 1c having defined therein a generally rectangular rear opening which is closed by a rear covering 6. The cabinet 1 accommodates therein a projector unit 4 which may comprise one or three projection cathode ray tubes and is positioned in a lower region of the interior of the cabinet 1 for directing imagewise rays of light towards a reflector 5 secured to the rear covering 6 within the cabinet 1. The reflector 5 is supported and inclined at an angle so that the imagewise rays of light from the projector unit 4 can be reflected towards the composite screen Sa.

The composite screen Sa used therein comprises a laminar structure including a first plate 2 made of acrylic resin and having a Fresnel lens formed on one surface thereof (plate 2 is hereinafter referred to as a "Fresnel lens plate") and a second plate 3 made of the same acrylic resin as the first plate 2 and having a lenticular lens formed on one surface thereof (plate 3 is hereinafter referred to as a "lenticular lens plate").

The composite screen Sa is mounted on the cabinet 1 in a manner as best shown in FIGS. 4 and 5. More specifically, the Fresnel lens plate 2 and the lenticular lens plate 3 have an equal height and an equal width as viewed from the position of a viewer in front of the television apparatus. However, the lenticular lens plate 3 has a thickness smaller than the thickness of the Fresnel lens plate 2. The Fresnel lens plate 2 and the lenticular lens plate 3 are combined together in a face-to-face relationship by the use of double-sided adhesive tape, generally identified by 7, which are applied to four side edge portions of the Fresnel lens plate 2 and the lenticular lens plate 3. The assembly of the Fresnel and lenticular lens plates 2 and 3 is secured to the front wall 1b of the cabinet 1 by four elongated fixtures 8 and set screws 9 so that the front opening 1a is covered with the Fresnel and lenticular lens plates 2 and 3 disposed close towards but remote from a projection source including the projector unit 4 and the reflector 5.

According to the prior art support system, as best shown in FIG. 5, the bottom edge of the composite screen Sa is held in contact with the bottom fixture 8 by gravitational force, and the design has been made so that a clearance is formed between the top side of the composite screen Sa and the top fixture 8 and also between any one of the opposite side edges of the composite screen Sa and the associated side fixture 8. The purpose of the clearance is for accommodating any possible thermal expansion of any one of the Fresnel and lenticular lens plates 2 and 3.

The acrylic resin used for any one of the Fresnel and lenticular lens plates 2 and 3 has been found to exhibit the physical characteristics as shown in FIGS. 6(a), 6(b) and 6(c). FIG. 6(a) illustrates the change in coefficient of linear expansion with respect to change in temperature, FIG. 6(b) illustrates the change in moisture content with respect to changes in relative humidity, and FIG. 6(c) illustrates the respect to changes in size with change in moisture content.

Although the Fresnel and lenticular lens plates 2 and 3 have different thicknesses, the amount of change in size resulting from an increase in relative humidity which in turn brings about an increase of the moisture content attains a level substantially equal to the level exhibited when the moisture content is in a saturated condition. However, during a period in which the moisture content varies from an initial level to a saturated level, the extent to which the size of the acrylic resin forming the Fresnel lens plates 2 changes is different from the extent in forming the lenticular elns plate 3 in the following manner because of the difference in thickness between the Fresnel and lenticular lens plates 2 and 3.

In the prior art composite screen Sa, since the lenticular lens plate 3 is greater in thickness than the Fresnel lens plate 2 and is therefore smaller in volume than the Fesnel lens plate 2, the moisture content of the lenticular lens plate 3 is apt to be quickly saturated. Moreover, since the lenticular lens plate 3 is exposed to the outside of the cabinet 1, the lenticular lens plate 3 is susceptible to absorption of ambient moisture. Because of this, the lenticular lens plate 3 tends to undergo more considerable expansion and deformation than in the Fresnel lens plate 2.

On the other hand, in the prior art support system all four sides of the lenticular lens plate 3 are connected with the associated sides of the Fresnel lens plate 2 by double-sided adhesive tape 7 applied thereto and the bottom edge of the lenticular lens plate 3 is clamped against the front wall 1b by the bottom fixture 8 together with the bottom edge of the Fresnel lens plate 2. Accordingly, an abrupt expansion of the lenticular lens plate 3 tends to be constrained which results in the tendency of the lenticular lens plate 3 to undulate. It is also found that, when the expansion of the lenticular lens plate 3 is constrained, swelling occurs at a lower region of the compsoite screen Sa under the influence of the weight of the lenticular lens plate itself and a void is consequently formed between the Fresnel and lenticular lens plates 2 and 3.

The undulation of the lenticular lens plate 3 and the formation of the void at the lower region of the composite screen Sa cause a considerable reduction in screen performance. Deformation is particularly considerable where the composite screen Sa is made larger in size with the increase of the demand for the projection type television apparatus utilizing the relatively large screen. Thereby the image projected on the relatively large composite screen Sa is apt to be distorted once the lenticular lens plate is deformed.

The Japanese Laid-open Patent Publication No. 60-61738 published April 9, 1985, discloses a technique similar to that discussed hereinabove with reference to FIGS. 3 to 5, but this technique differs therefrom because double-sided adhesive tape is applied to the top and side edge portions of the Fresnel and lenticular lens plates with the bottom portions thereof kept free. Even the technique disclosed in this publication is insufficient and the occurrence of the undulation and swelling in the composite screen cannot be eliminated.

SUMMARY OF THE INVENTION

Accordingly, the present invention has been devised with the aim at minimizing, or substantially eliminating, the problem inherent in the prior art screen systems and is intended to provide an improved composite back projection screen. Wherein the lenticular lens plate is so undersized relative to the Fresnel lens plate that, when the assembly of the Fresnel and lenticular lens plates is mounted and supported on the cabinet by means of the fixtures, the lenticular lens plate can be supported above the bottom fixture to avoid both undulation and the swelling.

In order to accomplished the above described object, there is provided, in accordance with the present invention, a video projector comprising a cabinet having a screen mounting opening defined therein so as to confront the position of a viewer in front of the video projector, a projector unit housed within the cabinet, and a generally rectangular composite screen secured to the cabinet so as to cover the screen mounting opening and adapted to receive imagewise rays of light from the projector unit. The composite screen comprises a laminar structure of a Fresnel lens plate and a lenticular lens plate, the lenticular lens plate having a height smaller than the height of the Fresnel lens plate with an upper edge aligned, and connected by means of adhesive tape with an upper edge of the Fresnel lens plate so that a lower edge of the lenticular lens plate opposite to the upper edge is offset in an upward direction relative to a lower edge of the Fresnel lens plate to provide a margin extending widthwise of the composite screen. The composite screen is secured to the cabinet and covers the screen mounting opening by means of at least first, second, third and fourth clamping fixtures disposed top, bottom and side edges of the composite screen, respectively. With the composite screen so supported, a gap is formed between the first clamping fixture and the top edge of the composite screen and also between the third and fourth clamping fixtures and the associated side edges of the composite screen.

According to the present invention, and considering the susceptibility of the lenticular lens plate to absorption of the ambient moisture which causes an elongation, the margin formed between the bottom edges of the respective lenticular lens plate and the Fresnel lens plate is effective to accommodate the expansion of the lenticular lens plate. Therefore, any possible undulation and/or swelling of the lenticular lens plate relative to the Fresnel lens plate can be substantially eliminated or minimized.

BRIEF DESCRIPTION OF THE DRAWINGS

In any event, the present invention will become more clearly understood from the following description of a preferred embodiment thereof, when taken in conjunction with the accompanying drawings. However, the embodiment and the drawings are given only for the purpose of illustration and explanation, and are not to be taken as limiting the scope of the present invention in any way whatsoever, which scope is to be determined solely by the appended claims. In the drawings, like reference numerals denote like parts in the several views, and:

DETAILED DESCRIPTION OF THE EMBODIMENT

Figure 1:
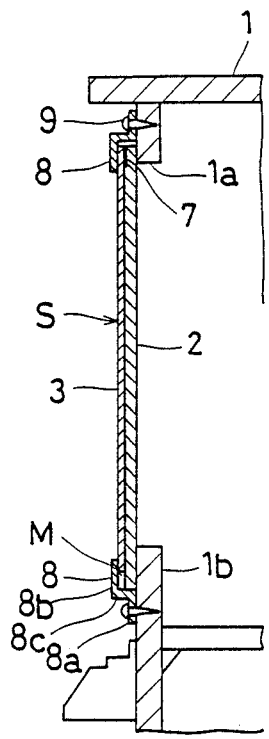
FIG. 1 is a schematic side sectional view of a front portion of a cabinet for a projection type television apparatus, showing composite screen according to the present invention.
Figure 2:
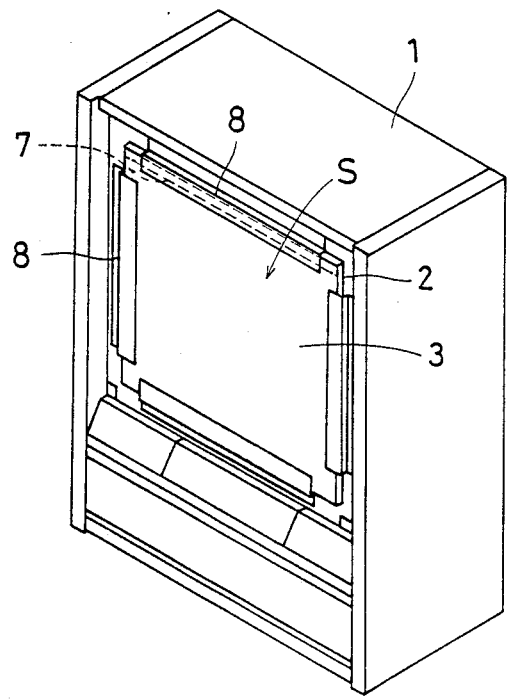
FIG. 2 is a schematic perspective view of the cabinet embodying the present invention.
Figure 3:
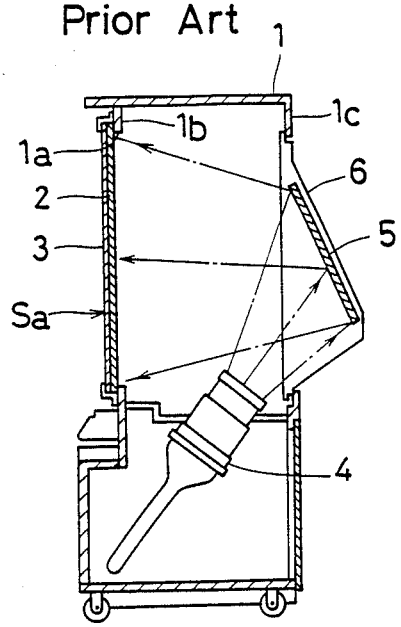
FIG. 3 is a schematic side sectional view of the prior art projection type television apparatus.
Figure 4:
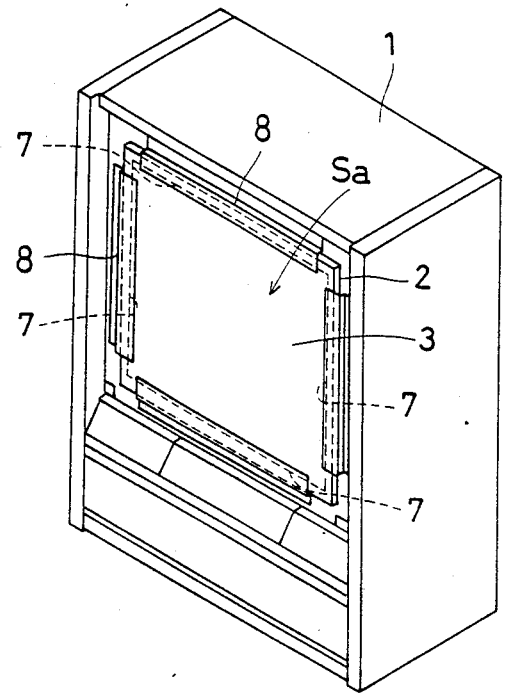
FIG. 4 is a schematic perspective view of the cabinet for the prior art projection type television apparatus.
Figure 5:
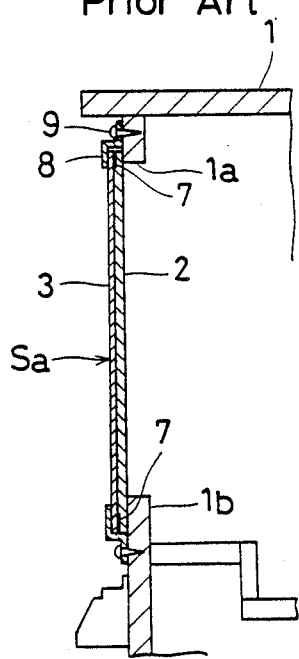
FIG. 5 is a schematic side sectional view of a front portion of the cabinet shown in FIG. 4, showing the prior art composite screen.
Figure 6A:
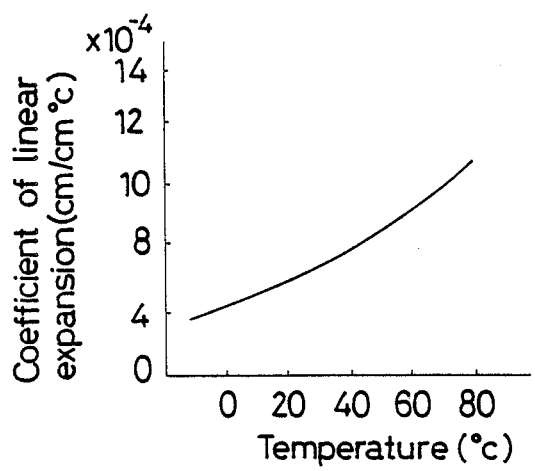
FIG. 6(a) is a graph showing the change in coefficient of linear expansion of an acrylic plate with respect to changes.
Figure 6B:
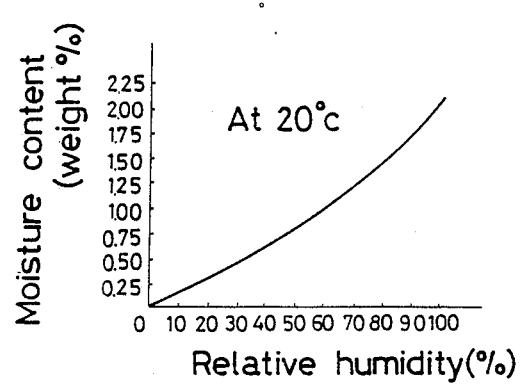
FIG. 6(b) is a graph showing the change in respect to changes relative humidity.
Figure 6C:
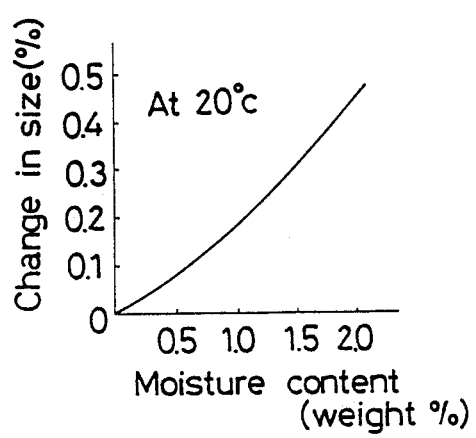
FIG. 6(c) is a graph showing the change in respect to changes content.

As is the case with the prior art composite screen Sa shown in and described with reference to FIGS. 3 to 5, a composite screen S used in an embodiment of the present invention comprises a rectangular laminar structure including the Fresnel lens plate 2 and a similarly rectangular lenticular lens plate 3, with both lenses being made of acrylic resin. However, in the composite screen S used in the present embodiment, the lenticular lens plate 3 has, as best shown in FIG. 1, a height smaller than the height of the Fresnel lens plate 2. The lenticular lens plate 3 so undersized as hereinabove described is combined together and are face-to-face contacted to each other with respective to the upper edges of the lenticular and Fresnel lens plates 3 and 2 aligned to and connected with each other by means of double-sided adhesive tape 7 which extends widthwise on the composite screen S. Thereby a margin M defined by the upward offset of a bottom edge of the lenticular lens plate 3 relative to that of the Fresnel lens plate 2 is left.

With respect to the width of each of the Fresnel and lenticular lens plates 2 and 3 forming the composite screen S, each lens may have a different width, however, it is preferred that each lens have an equal width.

The assembly of the Fresnel and lenticular lens plates 2 and 3 is combined together as hereinabove described and is secured to the cabinet 1 so as to cover the front opening 1a in the following manner.

Each of the top, bottom and side clamping fixtures 8 is, so far illustrated, of one-piece construction including an elongated connecting flange 8a and a similarly elongated trim flange 8b integrated together by means of a similarly elongated bridge 8c lying parallel, or substantially parallel, to any one of the connecting and trim flanges. The connecting flanges 8a of the top, bottom and side clamping fixtures 8 are adapted to be secured by means of the set screws 9 to upper, lower and side edge portions of the front wall 1b of the cabinet 1 which are peripheral to the front opening 1a in the front wall 1b. The trim flanges 8b of the top, bottom and side clamping fixtures 8 are operable, when the clamping fixtures 8 have been secured to the front wall 1b of the cabinet 1 with the respective set screws 9 passing through the respective connecting flanges 8a and then threaded to the peripheral upper, lower and side edge portions of the front wall 1b, to draw the composite screen S close to the front wall 1b of the cabinet 1. Thereby, to any possible separation of the composite screen S away from the cabinet 1 is avoided.

The mounting of the assembly of the Fresnel and lenticular lens plates 2 and 3 and the composite screen S, is carried out by connecting the bottom clamping fixture 8 to the lower edge portion of the front wall 1b in the manner described above immediately beneath the front opening 1a to extend widthwise thereof. The composite screen S is placed with the bottom edge thereof inserted into a gap between the lower edge portion of the front wall 1b around the front opening 1a and the trim flange 8b of such bottom clamping fixture 8 so that the composite screen S is seated on the elongated bridge 8c of the bottom clamping fixture 8, and the top and side clamping fixtures 8 are respectively connected to the upper and side edge portions of the front wall 1b above and lateral to the front opening 1a in the manner described above. Thereby the composite screen S is set in a position covering the front opening 1a in the cabinet 1.

When the top and side clamping fixtures 8 are to be connected to the upper and side edge portions of the front wall 1b of the cabinet 1 around the front opening 1a, care must be taken to form a clearance between any one of the top and side edges of the composite screen S and the elongated bridge 8c of the associated upper or side clamping fixtures 8. Only the clearance between the top edge of the composite screen S and the bridge 8c of the upper clamping fixture 8 is clearly shown in FIG. 1. As a matter of fact, the bottom edge of the composite screen S is held in contact with the elongated bridge 8c of the lower clamping fixture 8 by gravitational force. However, the margin indicated by M in FIG. 1 is retained because the Fresnel and lenticular lens plates 2 and 3 are connected together by means of double-sided adhesive tapes 7 with the top edges thereof aligned with each other as hereinbefore described.

Preferably, the trim flange 8b of at least the bottom clamping fixture 8 has a width slightly greater than the width of the margin M so that the indentation defined by the offset of the lenticular lens plate 3 on an upward direction relative to the Fresnel lens plate 2 to define the margin M can be shielded from the sight of the television viewer.

Considering that the lenticular lens plate 3 is smaller in thickness than the Fresnel lens plate 2, is more susceptible to absorption of ambient moisture as compared with the Fresnel lens plate 2 even though the Fresnel and lenticular lens plates 2 and 3 are made of the same material, i.e., acrylic resin, and is apt to expand more quickly, the presence of the margin M is effective to provide room for the lenticular lens plate 3 to expand. That is, the margin is effective to accommodate the expansion of the lenticular lens plate 3. Thereby any possible undulation and/or swelling of the lenticular lens plate 3 relative to the Fresnel lens plate 2 is avoided.

Attention is called to the fact that, if a margin is provided at the top of the composite screen that is, if the Fresnel and lenticular lens plates are connected together by the double-sided adhesive tape located along and between the respective bottom edges of the Fresnel and lenticular lens plates, a satisfactory effect to avoid the undulation and/or swelling of the lenticular lens plate cannot be obtained because the gravitational force acting on the entire lenticular lens plate is accumulated on the bottom portion of the lenticular lens 3 so that swelling of the bottom portion results.

Thus, it has now become clear that the present embodiment is effective to avoid any possible distortion of the picture projected on the composite screen which would otherwise result from the occurrence of the undulation and/or swelling of the lenticular lens plate relative to the Fresnel lens plate. Therefore, the present embodiment makes it possible to provide an increased size of the back projection screen without the screen performance being substantially reduced.

Although the present invention has fully been described in connection with the preferred embodiment thereof with reference to the accompanying drawings used only for the purpose of illustration, those skilled in the art will readily conceive numerous changes and modifications within the framework of obviousness upon the reading of the specification herein presented of the present invention. By way of example, although in the foregoing embodiment reference has been made to the use of one clamping fixture for each side of the rectangular shape of the front opening or the composite screen, two or more short clamping fixtures may be used therefor.

In another broad aspect of the present invention, each of the clamping fixtures may comprise a generally L-shaped mounting groove defined in each peripheral edge of the front wall of the cabinet around the front opening and a generally elongated clamping strip which, when secured to the associated peripheral edge of the front wall, defines a generally U-shaped mounting groove.

Where the Fresnel and lenticular lens plates have an equal width, the respective opposite side edges thereof are preferably aligned with each other.

Again, it is pointed out that the concept of the present invention can be equally applicable to a video projector of a type wherein no reflector is employed in the path of travel of the imagewise rays of light from the projector unit towards the composite screen.

Accordingly, such changes and modifications are, unless they depart from the spirit and scope of the present invention as delivered from the claims annexed hereto, to be construed as included therein.

What is claimed is:

1. A video projector comprising:
   a cabinet having a screen mounting opening defined therein so as to confront the position of a viewer in front of the video projector;
   a projector unit housed with the cabinet;
   a generally rectangular composite screen mounted to the cabinet so as to cover the screen mounting opening and adapted to receive imagewise rays of light from the projector unit, said composite screen comprising a laminar structure housing a Fresnel lens plate and a lenticular lens plate, the lenticular lens plate having a height smaller than the height of the Fresnel lens plate and an upper edge connected by adhesive tape with an upper edge of the Fresnel lens plate, such that a lower edge of the lenticular lens plate opposite to said upper edge of the lenticular lens plate is offset in an upward direction relative to a lower edge of the Fresnel lens plate to provide a margin extending along the width of the composite screen; and
   at least first, second, third and fourth clamping fixtures disposed on the top, bottom and side edges of the composite screen, respectively, for securing the composite screen to the cabinet while forming a first gap between the second clamping fixture and the top edge of the composite screen and second and third gaps between the third and fourth clamping fixtures and the associtaed side edges of the composite screen.

2. The video projector as claimed in claim 1, wherein the width of the lenticular lens plate is equal to the width of the Fresnel lens plate and the upper edge and opposite sides of the lenticular lens plate are aligned with the adjacent upper edge and the opposite sides of the Fresnel lens plate respectively when said lenticular and Fresnel lens plates are connected together.

3. The video projector as claimed in claim 1, further comprising a reflector plate supported inside the cabinet and disposed in a position to reflect the imagewise rays of light from the projector unit towards the composite screen.

4. The video projector as claimed in claim 1, wherein at least the first clamping fixture has an elongated flat area, when said first clamping fixture is connected to the cabinet at a location immediately beneath a lower edge of the screen mounting opening, said flat area lies in a plane substantially perpendicular to the plane of the screen mounting opening and only the lower edge of the Fresnel lens plate rests thereon while the lower edge of the lenticular lens plate is spaced at a predetermined distance above said flat area.

* * * * *